April 18, 1961    J. T. DUNTON    2,980,449
SELF-SEALING PIPE COUPLING
Filed Jan. 24, 1957

United States Patent Office 2,980,449
Patented Apr. 18, 1961

2,980,449

SELF-SEALING PIPE COUPLING

John T. Dunton, Bradford, Pa., assignor to Dresser Industries, Inc., Dallas, Tex., a corporation of Delaware Filed Jan. 24, 1957, Ser. No. 635,994

4 Claims. (Cl. 285—110)

The present invention relates to pipe couplings of the type that are self-sealing by the action of line pressure. Couplings in accordance with the invention are applicable to large size pipe for example pipes having a diameter of two feet or more as well as to smaller pipe sizes.

It is an object of the invention to provide pipe couplings that are inexpensive to manufacture, are easily installed and provide a lasting fluid tight pipe joint. The couplings in accordance with the invention are of extremely simple construction comprising merely an endless middle ring or sleeve portion that can be rolled or otherwise formed from tube or sheet stock and self-sealing gaskets of special configuration. Installation of the couplings is effected merely by stabbing the ends of pipe sections into the coupling, no bolting, clamping, tightening or other operations being required. As the couplings are used on plain end pipe, it is unnecessary to thread, groove, flare, machine or otherwise specially prepare the pipe ends. The couplings are suitable not only for metal pipe including thin wall pipe but also for pipe made of plastic, glass asbestos and other materials.

The pipe couplings of the present invention are similar to those of Risley at al. patent application, Serial No. 502,953 filed April 21, 1955 and now Patent 2,887,328 but represent a further improvement, particularly with respect to resistance of the couplings to reverse pressure. In some circumstances, for example when a line is drained or emptied, the pressure inside the line drops to a value lower than that outside the line so as to produce a partial vacuum. It has been found that this reverse pressure tends to displace the gasket of self-sealing couplings with the result that ground water is admitted to the line and the couplings are apt to leak when line pressure is again established. In accordance with the invention, the deleterious effects of pressure reversal are avoided by novel configuration of the gaskets in cooperation with gasket receiving channels of the coupling sleeve. Unlike certain temporary or "irrigation" couplings in which a certain amount of leakage is tolerated or even desired in order to make the lines self-draining, the couplings in accordance with the invention provide a permanently leak-proof joint.

Figure 1:
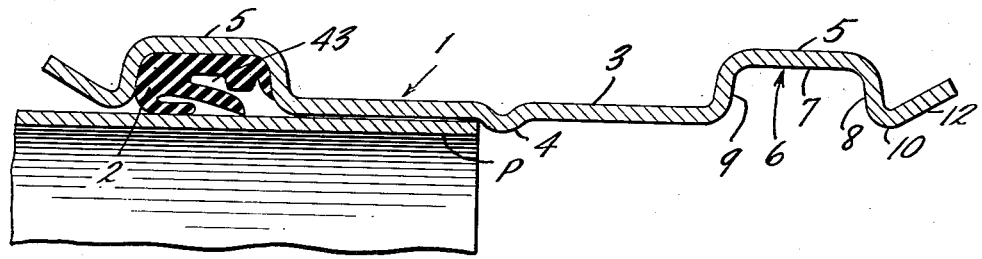

Other characteristics, objects and advantages of the invention will be understood from the following description and claims in conjunction with the accompanying drawings in which Fig. 1 is a radial, axial section of a pipe coupling in accordance with the invention, a pipe and gasket being shown in the left hand end only of the coupling.

Figure 2:

Fig. 2 is a similar fragmentary section showing the position of a gasket inserted in the coupling before a pipe is stabbed in.

Figure 3:
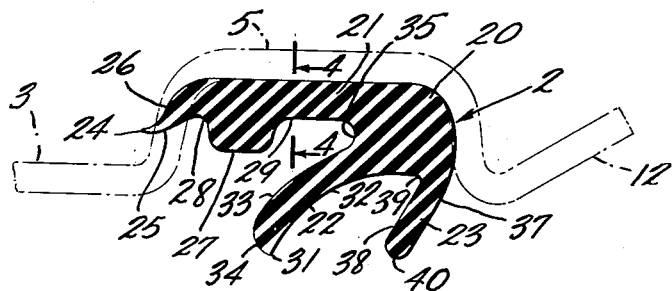
Figure 4:
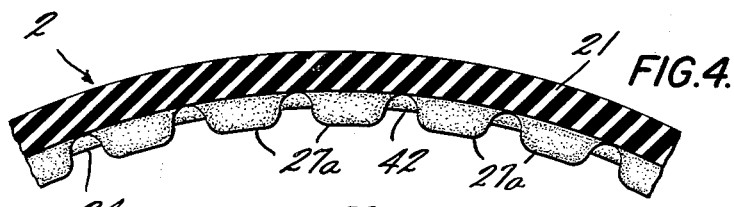

Fig. 3 is an enlarged cross section of the gasket in unconfined condition, the outline of the gasket-receiving channel of the coupling being shown in broken lines to illustrate the relation of the gasket to the channel, and Fig. 4 is a fragmentary section taken in a plane perpendicular to the axis of the coupling approximately on the line 4—4 in Fig. 3, but illustrating a modification of the gasket.

Figure 5:
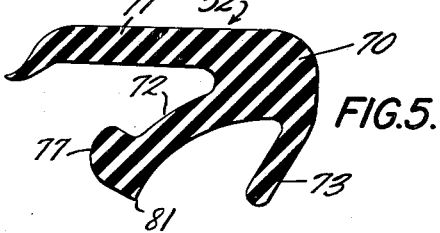

Fig. 5 is an enlarged cross section similar to Fig. 3 but showing another form of gasket.

As illustrated in the drawings, the coupling comprises a sleeve or middle ring 1 and self-sealing gaskets 2, only one such gasket being shown in Fig. 1. The middle ring 1 is of endless construction and has a tubular central portion 3 with an internal diameter of a size to receive the end of the pipe section P snugly but without binding. The distance a pipe is inserted into the coupling is limited by a pipe stop 4. At each end of the central portion 3 there is an integral channel portion 5 providing an inwardly opening annular channel 6. The channel 6 is of generally rectangular cross section with a substantially cylindrical peripheral wall 7, an outer end wall 8 and an inner end wall 9. The end walls 8 and 9 are approximately radial and hence approximately perpendicular to the peripheral wall 6. The width of channel 6 in an axial direction is substantially greater than its depth in a radial direction and is preferably two or three times as great. The outer end wall 8 extends radially inwardly to provide a pipe receiving aperture 10 having approximately the same inside diameter as that of the central sleeve portion 3. The outer ends of the middle ring are preferably flared outwardly as indicated at 12. It will be seen that the coupling sleeve 1 is of substantially uniform wall thickness throughout and of a configuration that can be rolled or otherwise readily formed from sheet or tube stock or easily molded of plastic or other material.

The gasket 2 is molded or otherwise suitably formed of a rubber composition or other elastomer material that is resilient and firm yet stretchable for example a material having durometer value of approximately 65 to 75. For convenience, the material of the gasket is herein referred to as "rubber" but it will be understood that this term comprises synthetic compositions as well as natural rubber. The gasket is made endless either by initially molding it as an endless ring or by forming an extruded or molded length into a ring. In cross sectional shape, the gasket 2 comprises a body portion 20 from which three integral flanges radiate. The flanges comprise an outer flange 21, an intermediate flange 22 and an inner flange 23. The outer flange 21 extends axially inwardly from the radially outer portion of the body portion 20 and terminates in a tapered lip portion 24. In unconfined condition of the gasket, the inner surface of the lip 24 is convex in cross section as indicated at 25 while the outer surface 26 is reversely curved so that the axially inner end portion of the outer flange 21 curves first radially inwardly and then axially inwardly. The extreme tip portion of the lip 24 hence projects in a substantially axial direction when the gasket is unconfined but is offset radially inwardly from the outer peripheral surface of the outer flange 21.

In accordance with the invention an annular rib 27 is provided on the inner face of the outer flange 21. The rib 27 is separated from the lip 24 by a valley 28 and is separated from the body portion 20 by a valley 29. Preferably the rib 27 is located axially inwardly from the midpoint of the gasket width but sufficiently far from the axially inner end of the outer flange 21 to avoid interfering with the sealing action of the lip 24. The thickness of the rib 27 in a radial direction is such that when the intermediate flange 22 is swung outwardly by the insertion of a pipe as illustrated at the left hand end of Fig. 1 the intermediate flange is closely adjacent the rib. In other words, the combined radial thickness of the outer flange 21, rib 27 and intermediate flange 22 is approximately equal to or slightly less than the radial depth of the channel 6. As will be seen from Fig. 3 where the outline of the channel 6 is indicated by broken lines, the overall axial width of the gasket including the body portion 20, outer flange 21 and lip portion 24 in unconfined condition is materially greater than the axial width of the substantially rectangular channel 6 of the sleeve portion 1. Hence when the gasket is pressed into the channel 6, it is compressed in an axial direction and the lip portion 24 is flexed axially outwardly by the inner end wall 9 of the channel to assure an initial sealing contact between the lip and the wall of the channel.

The intermediate flange 22 extends axially and radially inwardly from the body portion 20 of the gasket 2. As shown in the drawing, the flange 22 first extends approximately axially and then curves radially inwardly, ending in a lip 31. The inner surface 32 of the intermediate flange 22 is shown as a smooth concave curve while the outer surface 33 is convex in cross section. At the inner edge portion of the flange, the outer surface curves more shapely as indicated at 34 to intersect the inner surface 32 almost at right angles and thereby form the lip 31. Except for the lip portion, the intermediate flange 22 is shown as being of substantially uniform thickness throughout its width. At its radially outer portion, the intermediate flange 22 is almost parallel to the outer flange 21 and joins the outer flange in a radius 35. The width of the intermediate flange 22 is approximately equal to although preferably somewhat less than that of the outer flange 21 so that when the intermediate 22 is flexed radially outwardly, it will engage the rib 27 but the lip 31 of the intermediate flange will not reach the lip 24 of the outer flange.

The inner flange 23—in unconfined condition of the gasket—extends radially inwardly from the axially outer part of the body portion 20. The inner flange 23 is preferably inclined axially inwardly as shown but at a substantially greater angle to the outer flange 21 so that the intermediate flange 22 approximately bisects the angle between the inner and outer flanges. The axially outer surface 37 of the inner flange 23 curves smoothly into the axially outer surface of the body portion 20. The axially inner surface 38 of the inner flange 23 is substantially parallel to the axially outer face 37 and joins the radially inner face 32 of the intermediate flange 22 in a radius 39. The junction 35 between the intermediate flange 22 and the outer flange 21 is located a substantial distance axially inwardly from the junction 39 of the intermediate and inner flanges. This results in the body portion 20 having an axial length approximately as great or greater than its radial thickness. At its inner edge, the inner flange 23 terminates in a lip portion 40 which is preferably curved in cross section with a radius approximately equal to half the thickness of the flange 23. The width of the inner flange 23 is materially less than that of the intermediate flange 22. When the inner and intermediate flanges are flexed radially outwardly as illustrated at the left hand side of Fig. 1, the inner flange 23 preferably extends only approximately half way to the lip of the intermediate flange 22. The thickness of the inner flange 23 is preferably less than that of the intermediate flange 22. However, because of its lesser width, the inner flange 23 is relatively stiff and resistant to flexing. When the inner flange is flexed radially outwardly as shown in Fig. 1, it lies radially inwardly of the body portion 20 and the combined thickness in a radial direction of the body portion 20 and the inner flange 23 is approximately equal to the depth of the channel 6.

In assembling the coupling, the gasket 2 is inserted in the channel 6 of the sleeve 1—if it has not already been installed—and the end of the pipe section P is then stabbed into the coupling to the position shown in Fig. 1. In their unconfined condition as illustrated in Fig. 2, the intermediate and inner flanges 22 and 23 extend radially inwardly of the pipe aperture 10 and the inner surface of the central sleeve portion 3. The diameters of the circles defined by the annular lip portions 31 and 40 of the intermediate and inner flanges are hence materially less than the outside diameter of the pipe P. As the end of the pipe is stabbed into the coupling, it first engages the inner flange 23 tending to flex the flange radially outwardly and at the same time stretch it circumferentially. The resistance of the inner flange to flexing and stretching causes the axial thrust of the pipe end to exert forces tending to slide the gasket axially inwardly in the channel 6 and also tending to roll the gasket in the channel—the direction of roll of the gasket at the left hand end of the coupling shown in Fig. 1 being counterclockwise. However, axial movement of the gasket in the channel 6 is resisted by engagement of the lip portion 24 with the substantially radial inner wall 9 of the channel, the lip being "backed-up" by the rib 27. The rib also assists in holding the axially inner end portion of the outer flange 21 radially outwardly against the peripheral wall 7 of the channel and prevents it from being forced axially and radially inwardly into a smaller central portion 3 of the sleeve by the axial thrust of the pipe. Rolling of the gasket is resisted by the substantially rectangular shape of the channel 6 and corresponding shape of the gasket. The relatively massive body portion 20 in cooperation with the rib 27 further resists rolling by retaining the shape of the gasket and inhibiting radial movement of the axially outer end portion of the gasket.

After the end of the pipe slides past the inner flange 23 it engages the intermediate flange 22. Here the action is similar and axial displacement and rolling of the gasket are resisted in like manner. Moreover, the inner flange 23 now engages the outer surface of the pipe and further assists in preventing rolling of the gasket by the axial force exerted on it.

The diameters of the annular lips 31 and 40 of the intermediate and inner flanges bear such relation to the diameter of the pipe for which the coupling is designed that when the pipe is stabbed into the coupling the lip portions of the intermediate and inner flanges of the gasket are stretched approximately 5 to 10 percent. This assures a fluid tight initial contact between the lips and the pipe while at the same time avoiding premature aging of the rubber because of excessive stretching.

When the pipe P has been stabbed into the coupling as shown in Fig. 1 the intermediate flange 22 is flexed radially outwardly almost to the rib 27 and the inner flange 23 is flexed radially outwardly almost into engagement with the intermediate flange 22. Initial sealing engagement of the inner and intermediate flanges with the pipe is provided by the flexing and stretching of these flanges. Initial sealing engagement of the lip 24 of the outer flange 21 with the inner end wall 9 of the channel is assured by the axial compression of the gasket and the axially outward flexing of the lip 24 when the gasket is inserted in the channel 6. When line pressure is applied to the coupling, the fluid pressure of the line presses the intermediate flange 22 even more tightly against the pipe to assure lasting fluid tightness. The inner portion of the inner flange 23 is disposed between the pipe and the outer portion of the intermediate flange 22 thereby supporting the intermediate flange and assisting in preventing the intermediate flange being blown out by excessive line pressure. The fluid pressure of the line also presses the lip portion 24 and the outer flange 21 still more firmly into contact with the inner end wall 9 and peripheral wall 7 of the channel 6 to assure continued fluid tightness between the gasket and the sleeve 1. It will be seen that the line pressure tends to force the entire gasket axially outwardly and that this would tend to pull the lip 24 away from the inner end wall 9 of the channel. However, any such axial movement of the gasket is prevented by engagement of the relatively massive body portion 20 of the gasket with the substantially radial outer end wall 8 of the channel 6.

If the pressure in the pipe line falls below external pressure, for example through temporary emptying of the line, the outside pressure acts inwardly on the gasket 2. The relatively narrow and stiff inner flange 23 presses tightly against the pipe and resists the ingress of fluid into the pipe line. Hence, the inner flange 23 tends to prevent ground water from entering an underground pipe in which the pressure is temporarily reduced. External pressure applied to the gasket tends to move the gasket axially inwardly, thereby displacing it in the channel 6 if the pressure differential is sufficiently high. With the construction in accordance with the invention the rib 27 resists axially inward movement of the gasket and assists in retaining the gasket in its proper position in the channel. Moreover, the rib 27 acts as a stop between the axially inner portions of the outer and intermediate flanges, limiting radially outward movement of the intermediate flange 22 and radially inward movement of the outer flange 21 by external pressure acting on the gasket. By thus retaining the flanges in proper position, the rib 27 assists in assuring that as soon as the reverse pressure is removed, the intermediate flange will again seat properly on the pipe to provide a fluid tight seal.

The rib 27 on the inner face of the outer flange 21 may either be continuous and of uniform width and thickness or it may be interrupted by circumferentially spaced grooves or gaps 42 as illustrated by way of example in Fig. 4 so that the rib comprises a series of protuberances 27a. While a continuous uniform rib is easier to mold and has the advantage of greater circumferential strength, the spaced gaps 42 of the form shown in Fig. 4 assure that even if the intermediate flange 22 is pressed outwardly against the rib 27, for example by an oversized pipe, the gaps 42 always provide communication between the interior of the pipe line and the space 43 (Fig. 1) between the intermediate and outer flanges so that line pressure acts inwardly on the entire outer face of the intermediate flange.

Another form of gasket is shown in Fig. 5, in which corresponding parts are designated by the same reference numerals as in Figs. 1 to 3 with the addition of 50. Except as otherwise shown or described the gasket 52 of Fig. 5 is like that of the gasket 2 of Fig. 3 and comprises a body portion 70, outer flange 71, intermediate flange 72 and inner flange 73. A continuous or interrupted rib 77 provided on the radially outer face of the intermediate flange 72 is adapted to engage the outer flange 71 to act as a stop to limit radially outward flexing of the intermediate flange 72 and radially inward flexing of the outer flange 71. The rib 77 is located on the axially inner portion of the intermediate flange, being shown near the inner edge of the flange. In this position the rib 77 reinforces the lip 81 of the flange. If a more flexible lip is desired, the rib 77 is spaced from the lip but should be located on the axially inner half of the intermediate flange to serve its function effectively. The thickness of the rib 77 in a radial direction is such that when the intermediate flange 72 is flexed radially outwardly by the insertion of a pipe, the rib 77 is closely adjacent the outer flange 71. In the event line pressure drops below outside pressure, inward flexing of the outer flange 71 and outward flexing of the flange 72 are limited by engagement of the rib 77 with the outer flange.

While preferred forms of the invention have been herein specifically illustrated and described, it will be understood that the invention is not limited to these forms but may be varied within the scope of the invention defined by the appended claims.

What I claim and desire to secure by Letters Patent is:

1. A pipe joint for plain end pipe comprising a continuous annular sleeve portion having spaced axially aligned pipe receiving apertures and an inwardly opening annular channel between said apertures, an annular gasket of firm resilient stretchable elastomer material seated in said channel and a plain end pipe section stabbed into said sleeve portion through said pipe receiving apertures and gasket, said pipe receiving apertures having an internal diameter slightly larger than the external diameter of said pipe section to receive the plain end portion of said pipe section snugly without binding, said channel being of substantially rectangular cross section with a substantially cylindrical outer peripheral surface and an outer end surface and inner end surface extending radially inwardly from said peripheral surface and terminating respectively in said pipe receiving apertures, said gasket comprising a body portion seating against said peripheral surface and outer end surface of said channel and a plurality of flanges radiating from said body portion and comprising an outer flange extending axially inwardly from said body portion and having an outer peripheral surface seating on said peripheral surface of said channel, said outer flange terminating in a tapered lip portion that extends axially and radially inwardly at the axially inner end of said outer flange in sealing engagement with the inner end surface of said channel, the overall width in an axial direction of said outer flange portion with said body portion and said tapered lip portion in free condition being greater than the axial width of said channel so that when said gasket is seated in said channel, said tapered lip portion is pressed resiliently against said inner end surface of the channel to provide a seal, an intermediate flange which in unconfined condition extends axially and radially inwardly from said body portion at an acute angle to the longitudinal axis of the pipe section, said intermediate flange having in section taken through the longitudinal axis of the pipe section a width less than that of said outer flange and an inner flange extending radially inwardly from said body portion at an angle to said axis greater than that of said intermediate flange, the width of said inner flange being materially less than that of said intermediate flange, said intermediate and inner flanges terminating respectively in annular lip portions having inner diameters materially smaller in unconfined condition than said pipe receiving apertures so that said intermediate flange and inner flange are flexed radially outwardly when said plain pipe end portion is stabbed into said sleeve portion, and a narrow annular rib integral with one of said outer and intermediate flanges and positioned between said last mentioned flanges, said rib being spaced axially from said body portion and from said tapered lip portion and projecting radially toward the other of said last mentioned flanges in position to engage the axially inner portion of said other flange when said intermediate flange is flexed outwardly by the stabbing of said pipe end portion into said sleeve and thereby support said axially inner portion of said intermediate flange against further flexing and also support the axially inner portion of said outer flange against radially inward flexing to provide a fluid tight seal against both internal and external fluid pressure.

2. A pipe joint according to claim 1, in which said narrow rib is integral with said outer flange and projects radially inwardly toward said intermediate flange.

3. A pipe joint according to claim 1 in which said narrow rib is integral with said intermediate flange and projects radially outwardly toward said outer flange.

4. A pipe coupling according to claim 1, in which said lip portion of said outer flange in unconfined condition curves radially inwardly and then curves axially inwardly with a reverse curvature.

References Cited in the file of this patent
UNITED STATES PATENTS

| | | |
|---|---|---|
| 1,038,642 | Perry | Sept. 17, 1912 |
| 1,867,891 | Reynolds | July 19, 1932 |
| 1,945,293 | Pierce | Jan. 30, 1934 |
| 1,996,287 | Fisher | Apr. 2, 1935 |
| 2,049,801 | Gage | Aug. 4, 1936 |
| 2,778,695 | Sturtevant | Jan. 22, 1957 |
| 2,887,328 | Risley et al. | May 19, 1959 |

FOREIGN PATENTS

| | | |
|---|---|---|
| 323,252 | Great Britain | Dec. 18, 1929 |
| 344,006 | Great Britain | Feb. 23, 1931 |
| 455,605 | Italy | Mar. 9, 1950 |